United States Patent
Sestok, IV

(10) Patent No.: US 11,041,952 B2
(45) Date of Patent: Jun. 22, 2021

(54) PHASE-BASED ULTRASONIC RANGING

(71) Applicant: TEXAS INSTRUMENTS INCORPORATED, Dallas, TX (US)

(72) Inventor: Charles Kasimer Sestok, IV, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 904 days.

(21) Appl. No.: 15/391,524

(22) Filed: Dec. 27, 2016

(65) Prior Publication Data

US 2018/0180732 A1      Jun. 28, 2018

(51) Int. Cl.
| | | |
|---|---|---|
| G01S 15/931 | (2020.01) | |
| G01S 15/10 | (2006.01) | |
| G01S 15/36 | (2006.01) | |
| G01S 7/527 | (2006.01) | |

(52) U.S. Cl.
CPC ............ *G01S 15/931* (2013.01); *G01S 7/527* (2013.01); *G01S 15/101* (2013.01); *G01S 15/36* (2013.01); *G01S 2015/932* (2013.01); *G01S 2015/938* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,898,485 | A  * | 4/1999 | Nati, Jr. | G01S 17/66 356/5.07 |
| 2004/0129478 | A1* | 7/2004 | Breed | B60N 2/002 180/273 |
| 2005/0046584 | A1* | 3/2005 | Breed | B60C 11/24 340/13.31 |
| 2008/0236275 | A1* | 10/2008 | Breed | B60C 11/24 73/290 V |
| 2013/0065581 | A1* | 3/2013 | Hwang | H04B 17/336 455/422.1 |
| 2013/0144166 | A1* | 6/2013 | Specht | A61B 8/4444 600/441 |
| 2015/0002808 | A1* | 1/2015 | Rizzo, III | A61F 9/08 351/158 |
| 2015/0057718 | A1* | 2/2015 | Sharma | A61N 1/36007 607/40 |
| 2015/0224310 | A1* | 8/2015 | Sharma | A61N 1/36139 607/40 |
| 2017/0003391 | A1* | 1/2017 | Hallek | G01S 15/931 |
| 2018/0185011 | A1* | 7/2018 | Daft | A61B 8/145 |

* cited by examiner

*Primary Examiner* — Isam A Alsomiri
*Assistant Examiner* — Amie M Ndure
(74) *Attorney, Agent, or Firm* — Charles F. Koch; Charles A. Brill; Frank D. Cimino

(57) ABSTRACT

One example includes an ultrasonic ranging system. The system includes an ultrasonic transducer configured to transmit an ultrasonic signal and to receive reflected ultrasonic signal paths having been reflected from a plurality of target objects during a ranging operation. The system also includes a ranging processor configured to detect a location associated with the plurality of target objects based on monitoring phase information associated with the reflected ultrasonic signal paths.

20 Claims, 3 Drawing Sheets

PHASE-BASED ULTRASONIC RANGING

TECHNICAL FIELD

This disclosure relates generally to electronic systems, and more specifically to phase-based ultrasonic ranging.

BACKGROUND

Ultrasonic detection or ranging is a sensor implementation in which ultrasonic "sound" waves are emitted from an ultrasonic signal source. The ultrasonic waves can be reflected from a target object, such that a receiver can receive the reflected ultrasonic waves to determine a presence and/or location of the target object in an echo-location manner. Ultrasonic ranging can be implemented in a variety of different applications, such as to assist in navigation control for automobiles. For example, an automobile can include one or more ultrasonic transducers arranged at a periphery of the vehicle, such as on the bumpers, to provide sensing of obstacles. Therefore, in response to detecting an imminent obstacle via the ultrasonic waves, the ultrasonic ranging system can provide an alarm, such as an audible alarm, to the driver to warn of a potential imminent collision.

SUMMARY

One example includes an ultrasonic ranging system. The system includes an ultrasonic transducer configured to transmit an ultrasonic signal and to receive reflected ultrasonic signal paths having been reflected from a plurality of target objects during a ranging operation. The system also includes a ranging processor configured to detect a location associated with the plurality of target objects based on monitoring phase information associated with the reflected ultrasonic signal paths.

Another example includes a method for determining a location of a plurality of target objects in an ultrasonic ranging system. The method includes transmitting an ultrasonic signal from an ultrasonic transducer and receiving reflected ultrasonic signal paths having been reflected from a plurality of target objects. The method also includes generating digital samples associated with the reflected ultrasonic signal paths via an analog-to-digital converter (ADC) and generating a phase function associated with the digital samples via a ranging processor. The method further includes detecting the location associated with the plurality of target objects via the ranging processor based on the phase function.

Another example includes an ultrasonic ranging system. The system includes an ultrasonic transducer configured to transmit an ultrasonic signal and to receive reflected ultrasonic signal paths having been reflected from a plurality of target objects. The system also includes an analog-to-digital converter (ADC) configured to generate digital samples associated with the reflected ultrasonic signal paths. The system further includes a ranging processor configured to detect a location associated with the plurality of target objects based on monitoring phase information associated with the digital samples and detecting an abrupt phase change associated with the phase information.

DETAILED DESCRIPTION

This disclosure relates generally to electronic systems, and more specifically to phase-based ultrasonic ranging. An ultrasonic ranging system can implement phase-based detection of one or more target objects, as described herein. The ultrasonic ranging system includes an ultrasonic transducer that is configured to generate an ultrasonic signal that can be provided as ultrasonic waves having a predetermined frequency. The ultrasonic transducer can also receive reflected ultrasonic signal paths, such as reflected from one or more target objects. The reflected ultrasonic signal paths can be converted from an analog signal (e.g., voltage signal) to digital samples corresponding to the analog equivalent via an analog-to-digital converter (ADC). The digital samples can be provided to a ranging processor that is configured to calculate the location of the target objects.

The ranging processor can, for example, generate a phase function based on the digital samples that correspond to a phase of the received reflected ultrasonic signal paths. The ranging processor can be configured to implement a convolution operation on the phase function relative to a predetermined ramp function to generate a frequency profile associated with the received reflected ultrasonic signal paths. The ramp function convolved with the ADC output phase sample sequence can be symmetric about zero. For example, the sample sequence for a length five ramp function could be $\{-2, -1, 0, 1, 2\}$. For a signal with a single dominant frequency, convolution of the phase function samples with the ramp signal can produce a value that is proportional to the dominant frequency of the signal. Thus, the frequency profile can be compared with one or more thresholds to detect an abrupt phase change associated with the received reflected ultrasonic signal paths resulting from reflection from separate respective target objects. Accordingly, the ranging processor can detect multiple targets corresponding to each occurrence of the frequency profile falling outside the range defined by the threshold(s).

Figure 1:
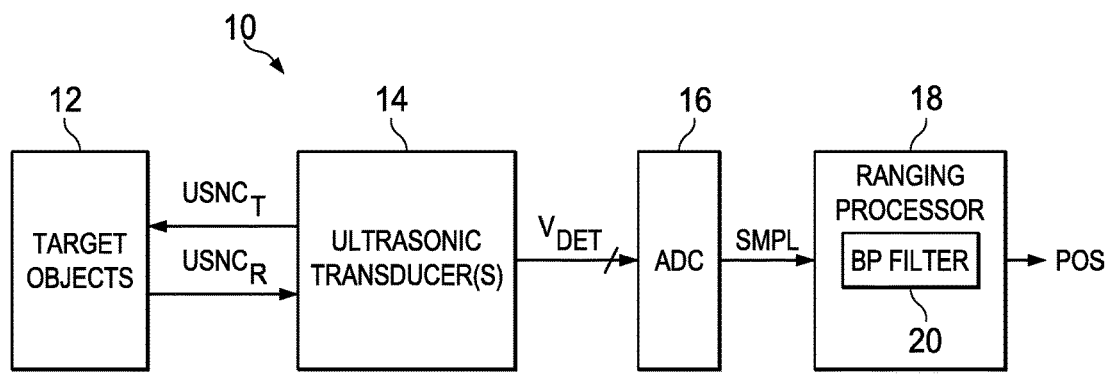
FIG. 1 illustrates an example of an ultrasonic ranging system.

FIG. 1 illustrates an example of an ultrasonic ranging system 10. The ultrasonic ranging system 10 can be implemented in any of a variety of ranging applications to detect a plurality of target objects 12. For example, the ultrasonic ranging system 10 can be implemented in an automobile parking assist system, such that at least a portion of the ultrasonic ranging system 10 can be arranged in the bumper of a respective automobile.

The ultrasonic ranging system 10 includes at least one ultrasonic transducer 14. Each of the ultrasonic transducer(s) 14 is configured to transmit an ultrasonic signal $USNC_T$ and to receive reflected ultrasonic signal paths $USNC_R$ having been reflected from the target objects 12 during a ranging operation. The ultrasonic signal $USNC_T$ can be generated via excitation of the ultrasonic transducer 14 to drive the ultrasonic signal $USNC_T$ at a predetermined frequency, such that the reflected ultrasonic signal path(s) $USNC_R$ can be received at a frequency that is approximately equal to the predetermined frequency. In the example of FIG. 1, the reflected ultrasonic signal path(s) $USNC_R$ are converted to a voltage signal $V_{DET}$ by the respective ultrasonic transducer(s) 14, which are provided to an analog-to-digital converter (ADC) 16. The ADC 16 is configured to convert the voltage signal $V_{DET}$ associated with each of the ultrasonic transducer(s) 14 to digital samples, demonstrated in the example of FIG. 1 as a signal DET.

The digital samples SMPL are provided to a ranging processor 18. The ranging processor 18 is configured to determine the location of the target objects 12 based on phase information associated with the reflected ultrasonic signal path(s) $USNC_R$, as provided in the digital samples SMPL. In the example of FIG. 1, the ranging processor 18 includes a band-pass (BP) filter 20 that is configured to filter the digital samples SMPL. As an example, the band-pass filter 20 can filter low frequency samples to substantially reject DC offset associated with the digital samples SMPL. As another example, the band-pass filter 20 can filter high frequency samples to substantially reject noise associated with the digital samples SMPL. Therefore, the band-pass filter 20 can pass the appropriate digital samples SMPL for processing by the ranging processor 18 to determine the location of the target objects 12, as described in greater detail herein. Additionally, while the band-pass filter 20 is demonstrated as being a part of the ranging processor 18, it is to be understood that the band-pass filter 20 can be arranged as software, hardware, or a combination thereof, and can be separately configured in the data flow (e.g., upstream of the ADC 16). Accordingly, the band-pass filter 20 can be configured in a plurality of different ways.

As an example, the ranging processor 18 can generate a phase function φ(t), as described in greater detail herein, based on the digital samples SMPL that correspond to phase information of the received reflected ultrasonic signal paths $USNC_R$. The ranging processor 18 can be configured to implement a convolution operation on the phase function relative to a predetermined ramp function to generate a frequency profile associated with an instantaneous frequency of the received reflected ultrasonic signal paths. Thus, the frequency profile can be compared with one or more thresholds to detect the location of the target objects 12. For example, the frequency profile can be between a first threshold and second threshold for a predetermined time duration to detect a first of the target objects 12, and can fall outside the range defined by the first and second thresholds to indicate abrupt phase changes of the received reflected ultrasonic signal paths $USNC_R$ resulting from reflection from respective other target objects, thus indicating a location of the respective other target objects 12 based on a time at which the reflected ultrasonic signal paths $USNC_R$ are received. Accordingly, the ranging processor 18 can detect multiple targets corresponding to each occurrence of the frequency profile falling outside the range defined by the threshold(s).

As an example, the ultrasonic ranging system 10 can include a plurality of the ultrasonic transducers 14. Therefore, each of the ultrasonic transducers 14 can transmit separate respective ultrasonic signals $USNC_T$ (e.g., at different frequencies), and each can receive separate respective sets of reflected ultrasonic signal paths $USNC_R$. As a result, the ranging processor 18, or a plurality of ranging processors 18, can determine a distance of each of the target objects 12 from each of the respective ultrasonic transducers 14. Therefore, the ranging processor(s) 18 can be configured to detect the location associated with each of the plurality of target objects 12 based on triangulating the phase information corresponding to the distances associated with each of the reflected ultrasonic signal paths $USNC_R$. Accordingly, the ultrasonic ranging system 10 can be configured to determine the locations of the target objects 12 in three-dimensional space.

Figure 2:
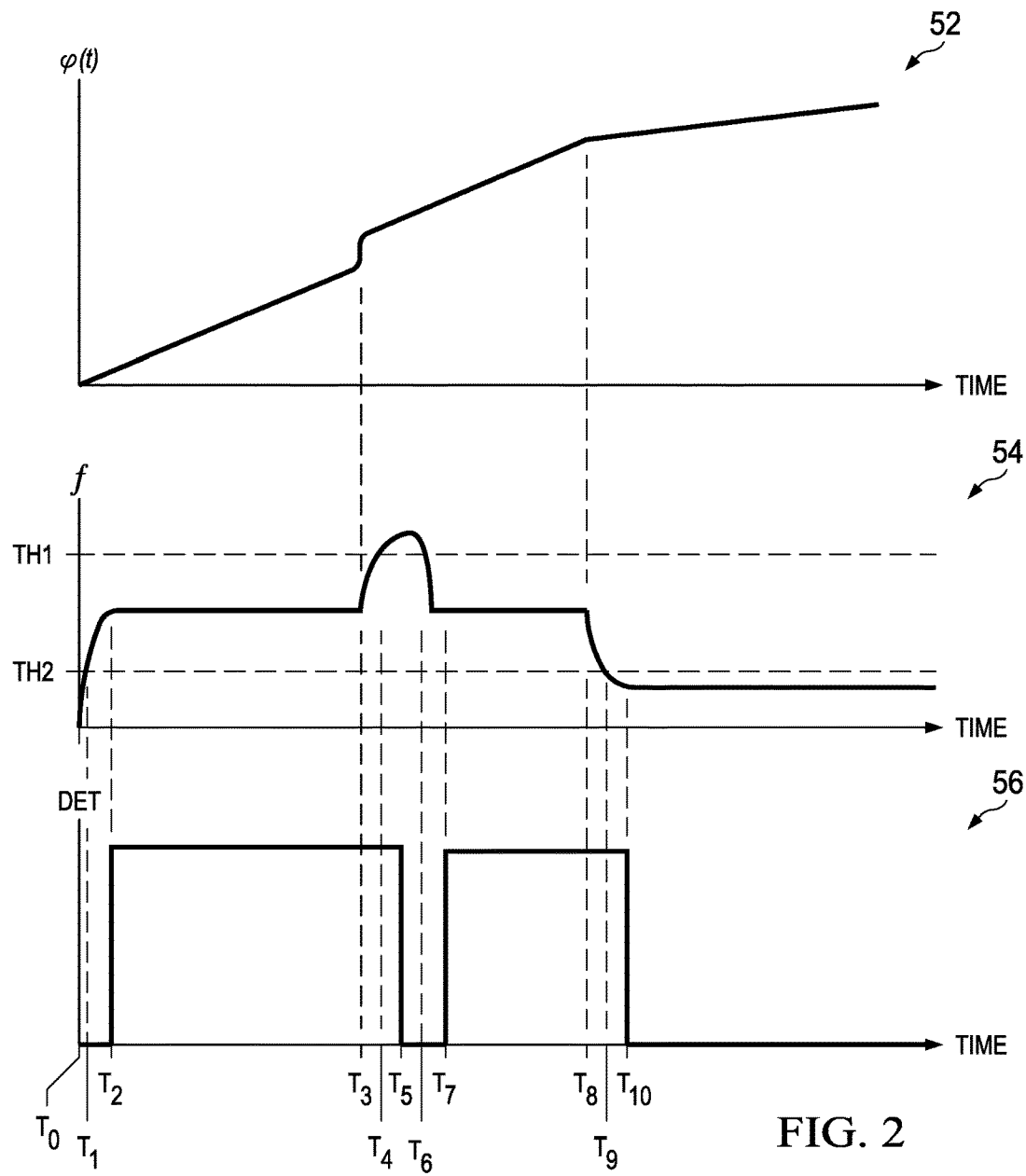
FIG. 2 illustrates example timing diagrams of object detection in an ultrasonic ranging system.

FIG. 2 illustrates example timing diagrams of object detection in an ultrasonic ranging system. Particularly, the example of FIG. 2 demonstrates a first timing diagram 52 that plots a phase function φ(t) with respect to time, a second timing diagram 54 that plots a frequency profile f (e.g., instantaneous frequency profile) with respect to time, and a third timing diagram 56 that plots a digital detection signal DET corresponding to detection of the target objects 12. The timing diagrams 52, 54, and 56 are demonstrated as coterminous in time, and can correspond to operation of the ultrasonic ranging system 10 in the example of FIG. 1. Therefore, reference is to be made to the example of FIG. 1 in the following description of the example of FIG. 2. For simplicity, the notation and plots are displayed in the timing diagrams 52, 54, and 56 as continuous curves. However, in practice, the diagrams can correspond to sequences of samples since the data was captured by the ADC 16.

As described previously, the ranging processor 18 is configured to generate the phase function φ(t) based on the digital samples SMPL. For example, the ranging processor 18 can first compute a complex analytic signal from the output of the band-pass filter 20. To accomplish this, the ranging processor 18 can transform an input signal x(t) of the digital samples SMPL into two output signals: i(t) and q(t), corresponding to the real and imaginary parts of the complex analytic signal. The ranging processor 18 can then compute an angle for each analytic signal sample, such as based on implementing an inverse tangent function. For example, a given sample can be expressed as pl(t)= $\tan^{-1}(q(t)/i(t))$. This can always provide an angle between, for example −180 degrees and 180 degrees. The ranging processor 18 could then implement phase unwrapping. For example, when a large jump in pl(t) is detected because of the limited range between −180 and 180 degrees, the sequence is compensated by adding in either +360 or −360 degrees to all the subsequent samples, depending on the size of the phase jump. Accordingly, the phase function φ(t) can be generated based on the phase-unwrapped samples pl(t).

In the example of FIG. 2, prior to a time $T_0$, the ultrasonic transducer 14 can be activated (e.g., driven by a signal) to transmit the ultrasonic signal $USNC_T$, and thus to transmit ultrasonic waves. As an example, the ultrasonic transducer 14 can be activated for a predetermined duration of time to provide the ultrasonic signal $USNC_T$ as a pulse during a given ranging operation, after which time the ultrasonic transducer 14 can experience ringdown, in which the deactivated ultrasonic transducer 14 continues to emit damped ultrasonic energy at a frequency that differs from the predetermined frequency of the ultrasonic signal $USNC_T$. At the time $T_0$, the ultrasonic transducer 14 receives a reflected ultrasonic signal path $USNC_R$ corresponding to a reflection of the ultrasonic signal $USNC_T$ from one of the target objects 12.

At the time $T_0$, in response to the ranging processor 18 detecting the energy received from the reflected ultrasonic signal path $USNC_R$, the ranging processor 18 can implement a convolution operation between the phase function φ(t) and a predetermined ramp function rmp(t). The convolution operation can thus provide the frequency profile f in the timing diagram 54. The frequency profile f can correspond to an instantaneous frequency profile of the reflected ultrasonic signal paths $USNC_R$ during the ranging operation. During time intervals when the $USNC_R$ contains energy at the predetermined frequency, the phase function φ(t) is a ramp as well. Therefore, based on the convolution operation between the phase function φ(t) and the predetermined ramp function rmp(t), the frequency profile f has a substantially zero slope at steady state during the received reflected ultrasonic signal paths $USNC_R$. Thus, the phase function φ(t) begins to increase based on the predetermined frequency of the ultrasonic signal $USNC_T$. As a result, beginning at the time $T_0$, the frequency profile f increases from approximately zero to a substantially zero slope during a steady state of receiving a given one of the reflected ultrasonic signal paths $USNC_R$.

The ranging processor 18 is also configured to compare the frequency profile f with at least one predetermined threshold. In the example of FIG. 2, the second timing diagram 54 includes a first predetermined threshold TH1 and a second predetermined threshold TH2. The first predetermined threshold TH1 is demonstrated at a higher frequency than the second predetermined threshold TH2, and the first and second predetermined thresholds TH1 and TH2 can be selected to be approximately equal and opposite with respect to the frequency profile f having a value corresponding to the predetermined frequency of $USNC_T$ at a steady state. Therefore, in response to the ultrasonic transducer 14 receiving the first reflected ultrasonic signal path $USNC_R$, the frequency profile f can have a substantially constant frequency that is approximately centered between the first and second predetermined thresholds TH1 and TH2. As an example, the ranging processor 18 can be configured to compare the frequency profile f with the predetermined thresholds TH1 and TH2 based on a clock, such that the ranging processor 18 can filter out spurious changes to the frequency profile f (e.g., based on noise) and can determine the location of additional target objects and/or ringdown of the ultrasonic transducer 14 based on the frequency profile f falling outside the threshold range (i.e., increasing greater than the first predetermined threshold TH1 or decreasing less than the second predetermined threshold TH2), as described in greater detail herein.

At a time $T_1$, the frequency profile f crosses the second predetermined threshold TH2 as it increases from approximately zero to the steady state amplitude. In response to detecting that the frequency profile f crossed the second predetermined threshold TH2, the ranging processor 18 can begin a counter that counts clock cycles. In response to the frequency profile f decreasing less than the second predetermined threshold TH2 before the counter achieves a predetermined threshold count value, the ranging processor 18 can dismiss the crossing as merely noise, and can thus ignore the transition of the frequency profile f crossing the second predetermined threshold TH2. However, in response to the frequency profile f maintaining an amplitude greater than the second predetermined threshold TH2 until the counter achieves the predetermined threshold count value, the ranging processor 18 can detect that the received ultrasonic energy does indeed correspond to a first reflected ultrasonic signal path $USNC_R$. In response, the ranging processor 18 can assert the digital detection signal DET to indicate that the first target object 12 has been detected. Based on the time elapsed between the time of transmitting the ultrasonic signal $USNC_T$ and the time $T_1$ at which the first reflected ultrasonic signal path $USNC_R$ was actually detected crossing a threshold, the ranging processor 18 can thus determine a distance from the ultrasonic transducer 14 to the first target object 12, and thus can identify a location of the first target object 12.

At a time $T_3$, a second of the reflected ultrasonic signal paths $USNC_R$ is received at the ultrasonic transducer 14. The local phase of the digital samples SMPL changes discontinuously in response to the arrival of a second reflected ultrasonic signal path $USNC_R$ from a second target object 12. As a result, the phase function φ(t) temporarily increases as the abrupt phase change relative to the slope of the phase function φ(t). Based on the convolution operation between the phase function φ(t) and the predetermined ramp function rmp(t), the frequency profile f exhibits a temporary increase beginning at the time $T_3$ based on the abrupt phase change in the phase function φ(t). In the example of FIG. 2, at a time $T_4$, the frequency profile f is demonstrated as increasing greater than the first predetermined threshold TH1. The time that the frequency profile f remains outside the region defined by the predetermined thresholds TH1 and TH2 is measured by a counter. In response to the duration of the counter value exceeding a predetermined count value while the frequency profile f remains outside the region defined by the predetermined thresholds TH1 and TH2, the ranging processor 18 can de-assert the digital detection signal DET at time $T_5$.

At a time $T_6$, the frequency profile decreases and crosses the first predetermined threshold TH1 again to return to the steady-state frequency based on the slope of the phase function φ(t) resuming steady-state, based on the substantially equal frequency of the first and second reflected ultrasonic signal paths $USNC_R$, and thus in response to the convolution operation. As an example, the ranging processor 18 can monitor a duration of time that the frequency profile f is again between the first and second predetermined thresholds TH1 and TH2 (e.g., based on the counter described previously). Therefore, in response to the frequency profile f being less than the first predetermined threshold TH1 and greater than the second predetermined threshold TH2 for the predetermined threshold count value, the ranging processor 18 can determine that the ultrasonic transducer 14 received a second reflected ultrasonic signal path $USNC_R$ from a second target object 12. At a time $T_7$, the ranging processor 18 can assert the digital detection signal DET to indicate that the second target object 12 has been detected. Based on the time elapsed between the time of transmitting the ultrasonic signal $USNC_T$ and the time $T_7$ at which the detection signal DET was re-asserted, the ranging processor 18 can thus determine a distance from the ultrasonic transducer 14 to the second target object 12, and thus can identify a location of the second target object 12.

At a time $T_8$, the phase function φ(t) can enter a ringdown region. The ringdown region can correspond to a time in which the ultrasonic energy that is received at the ultrasonic transducer 14 no longer includes any reflected energy corresponding to the ultrasonic signal $USNC_T$, but instead includes only the ringdown energy. As a result, the phase function φ(t) changes the slope based on a change in frequency of the received ultrasonic energy (e.g., as reflected from the target objects 12), with the frequency of the ringdown energy being based on manufacturing tolerances associated with the ultrasonic transducer 14, and therefore being unpredictable. As a result, the frequency profile f is demonstrated as decreasing beginning at the time $T_8$. At a time $T_9$, the frequency profile f decreases less than the second predetermined threshold TH2. At time $T_{10}$, the count for the duration outside the region defined by the thresholds while DET is asserted exceeds its maximum value. Thus, the ranging processor 18 de-asserts the digital detection signal DET at the time $T_8$. The frequency profile f remains less than the second predetermined threshold TH2 thereafter based on the change in frequency associated with the phase function φ(t). Therefore, the ranging processor 18 can conclude the ranging operation, and thus the detection of the target objects 12 until initiating the next ranging operation.

The example of FIG. 2 demonstrates the detection of two target objects 12, one at approximately time $T_0$ and another at approximately time $T_3$. It is to be understood that additional target objects can be detected by the ultrasonic ranging system 10 during the ranging operation. As an example, additional reflected ultrasonic signal paths $USNC_R$ can be received that each corresponds to additional target objects 12. Each of the additional reflected ultrasonic signal paths $USNC_R$ can exhibit a substantially similar abrupt phase change in the phase function φ(t) as demonstrated at the time $T_1$, and thus exhibit a substantially similar change in the frequency profile f as demonstrated at the time $T_3$ (e.g., as demonstrated in the examples of FIGS. 4 and 5). Accordingly, the ranging processor 18 can be configured to detect multiple target objects 12 and determine a respective location (e.g., distance from the ultrasonic transducer 14) based on the time of detection of the respective reflected ultrasonic signal paths $USNC_R$. Additionally, while it is demonstrated in the example of FIG. 2 that the abrupt phase change at the time $T_3$ is an increase in the phase function φ(t) and frequency profile f, and that the ringdown region at the time $T_8$ is a decrease in the phase function φ(t) and frequency profile f, it is to be understood that such changes to the phase function φ(t) and frequency profile f are arbitrary, and could be reversed. Therefore, the ranging processor 18 can determine abrupt phase changes and ringdown region based on the frequency profile f falling outside the range defined by the predetermined thresholds TH1 and TH2 and based on monitoring a respective time duration.

Therefore, the ultrasonic ranging system 10 can monitor the phase information of the of the digital samples SMPL to determine the presence of other target objects 12 that generate other reflected ultrasonic signal paths $USNC_R$. Such ultrasonic ranging that implements phase information can provide an improved ultrasonic ranging technique relative to typical systems that implement amplitude sensing of reflected ultrasonic signals. Particularly, typical ultrasonic ranging techniques that monitor amplitude of reflected ultrasonic signal paths, such as based on threshold comparison, may not be able to effectively distinguish closely separated target objects. Therefore, the ultrasonic ranging system 10 can provide a more effective manner of sensing target objects based on being better able to distinguish closely separated target objects 12.

Figure 3:
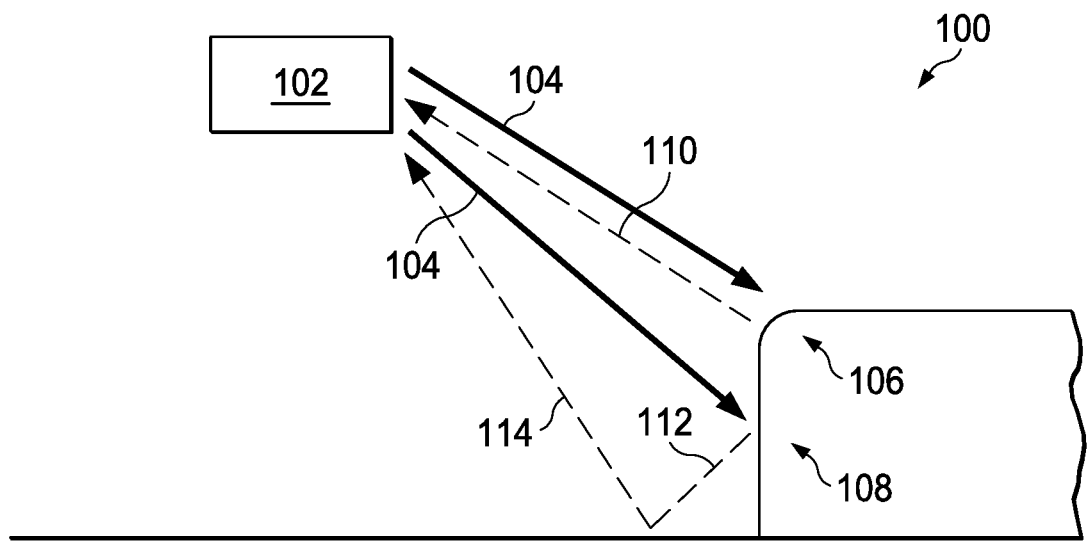
FIG. 3 illustrates an example diagram of object detection in an ultrasonic ranging system.

FIG. 3 illustrates an example diagram 100 of object detection in the ultrasonic ranging system 10. The diagram 100 demonstrates a parking assist application for an automobile. The diagram 100 can correspond to the timing diagrams 52, 54, and 56 in the example of FIG. 2. Therefore, reference is to be made to the examples of FIGS. 1 and 2 in the following description of the example of FIG. 3.

The diagram 100 demonstrates an ultrasonic transducer 102, such as mounted in a bumper of an automobile. The ultrasonic transducer 102 transmits an ultrasonic signal $USNC_T$, which is demonstrated in the example of FIG. 3 as arrows 104. It is to be understood that while the ultrasonic signal 104 is demonstrated by two arrows 104, the ultrasonic signal 104 is transmitted in substantially all directions from the ultrasonic transducer 102. The arrows 104 thus merely demonstrate a transmitted signal path of the ultrasonic signal $USNC_T$, and thus transmission to the target objects, as described herein. The diagram 100 demonstrates that the ultrasonic signals 104 are transmitted to a first target object 106, demonstrated as a normal surface of a curb (i.e., a normal vector with respect to a tangent of the edge of the curb), and to a second target object 108, demonstrated as a front surface of the curb.

The ultrasonic signal 104 is thus reflected from the first target object 106 to provide a first reflected ultrasonic signal path $USNC_R$, demonstrated as an arrow 110, and from the second target object 108 to provide a second reflected ultrasonic signal path $USNC_R$, demonstrated as arrows 112 and 114. The arrow 110 demonstrates reflection of the ultrasonic signal 104 from the first target object 106 directly back to the ultrasonic transducer 102. The arrow 112 demonstrates reflection of the ultrasonic signal 104 from the second target object 108 to ground (e.g., road, asphalt, etc.), and the arrow 114 demonstrates reflection of the ultrasonic signal 104 from ground back to the ultrasonic transducer 102. Therefore, the ultrasonic signal 104 is reflected back to the ultrasonic transducer 102 via two reflected ultrasonic signal paths $USNC_R$. Accordingly, the ultrasonic ranging system 10 can determine a distance of the first and second target objects 106 and 108 based on the time at which the reflected ultrasonic signal paths 110 and 114 are received at the ultrasonic transducer 102. The detection of the arrival of the reflected ultrasonic signal paths 110 and 114 are received at the ultrasonic transducer 102 can correspond to the detection demonstrated in the example of FIG. 2.

Figure 4:
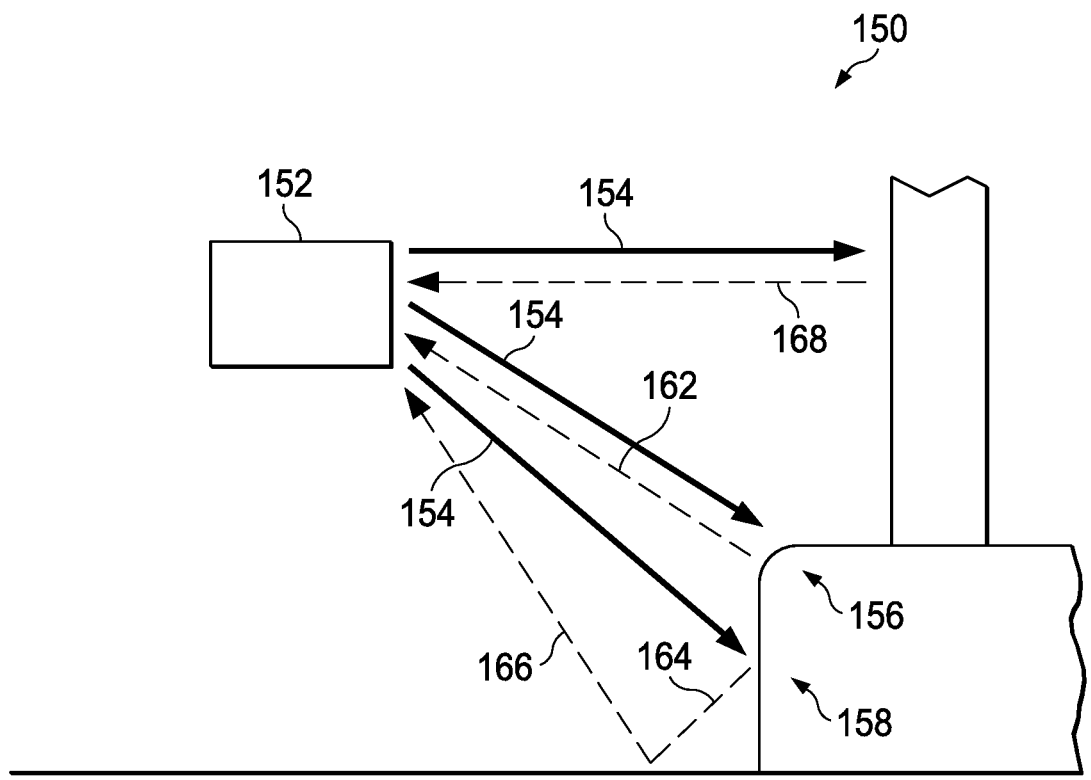
FIG. 4 illustrates an example diagram of object detection in an ultrasonic ranging system.

FIG. 4 illustrates another example diagram 150 of object detection in the ultrasonic ranging system 10. The diagram 150 demonstrates a parking assist application for an automobile. The diagram 150 can correspond to the timing diagrams 52, 54, and 56 in the example of FIG. 2. Therefore, reference is to be made to the examples of FIGS. 1 and 2 in the following description of the example of FIG. 4.

The diagram 150 demonstrates an ultrasonic transducer 152, such as mounted in a bumper of an automobile. The ultrasonic transducer 152 transmits an ultrasonic signal $USNC_T$, which is demonstrated in the example of FIG. 4 as arrows 154. It is to be understood that while the ultrasonic signal 154 is demonstrated by three arrows 154, the ultrasonic signal 154 is transmitted in substantially all directions from the ultrasonic transducer 152. The arrows 154 thus merely demonstrate a transmitted signal path of the ultrasonic signal $USNC_T$, and thus transmission to the target objects, as described herein. The diagram 150 demonstrates that the ultrasonic signals 154 are transmitted to a first target object 156, demonstrated as a normal surface of a curb (i.e., a normal vector with respect to a tangent of the edge of the curb), to a second target object 158, demonstrated as a front surface of the curb, and a third target object 160, demonstrated as a post that extends from a top surface of the curb.

The ultrasonic signal 154 is thus reflected from the first target object 156 to provide a first reflected ultrasonic signal path $USNC_R$, demonstrated as an arrow 162, from the second target object 158 to provide a second reflected ultrasonic signal path $USNC_R$, demonstrated as arrows 164 and 166, and from the third target object 160 to provide a third reflected ultrasonic signal path $USNC_R$, demonstrated as an arrow 168. The arrow 162 demonstrates reflection of the ultrasonic signal 154 from the first target object 156 directly back to the ultrasonic transducer 152. The arrow 164 demonstrates reflection of the ultrasonic signal 154 from the second target object 158 to ground (e.g., road, asphalt, etc.), and the arrow 166 demonstrates reflection of the ultrasonic signal 154 from ground back to the ultrasonic transducer 152. The arrow 168 demonstrates reflection of the ultrasonic signal 154 from the third target object 158 directly back to the ultrasonic transducer 152. Therefore, the ultrasonic signal 154 is reflected back to the ultrasonic transducer 152 via three reflected ultrasonic signal paths $USNC_R$. Accordingly, the ultrasonic ranging system 10 can determine a distance of the first, second, and third target objects 156, 158, and 160 based on the time at which the reflected ultrasonic signal paths 162, 166, and 168 are received at the ultrasonic transducer 152.

Figure 5:
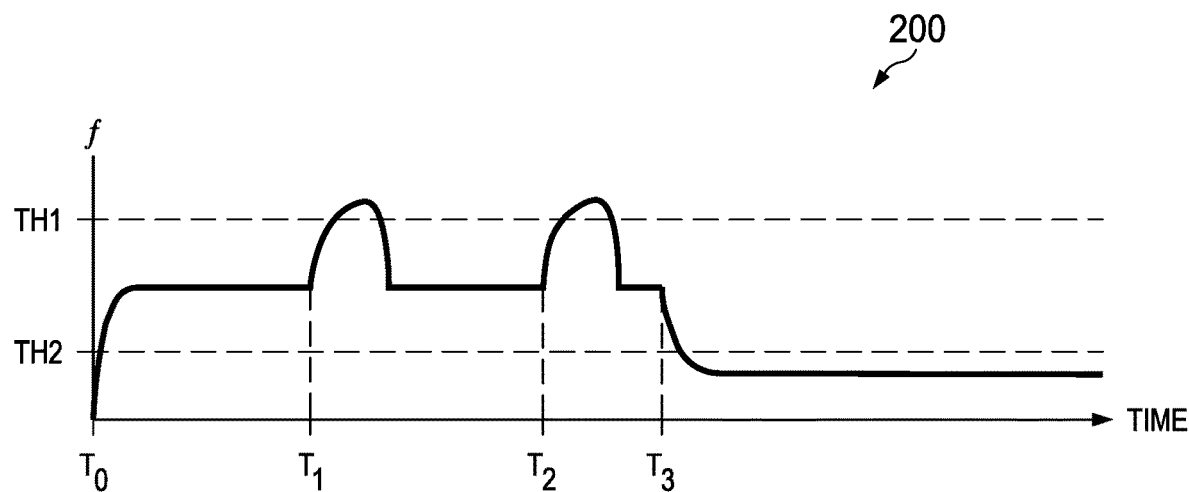
FIG. 5 illustrates an example timing diagram of object detection in an ultrasonic ranging system.

FIG. 5 illustrates an example timing diagram 200 of object detection in the ultrasonic ranging system 10. The timing diagram 200 demonstrates a frequency profile f, similar to the frequency profile f in the example of FIG. 2. The timing diagram 200 can correspond to the detection of the target objects in the example diagram 150 of the example of FIG. 4. Therefore, reference is to be made to the example of FIG. 4 in the following description of the example of FIG. 5.

At a time $T_0$, the ultrasonic transducer 152 receives the first reflected ultrasonic signal path 162 having been reflected from the first target object 156 directly back to the ultrasonic transducer 152. Therefore, the ranging processor 18 can implement a convolution operation between a phase function $\varphi(t)$ and a predetermined ramp function rmp(t), similar to as described previously in the example of FIG. 2. The convolution operation can thus provide the frequency profile f that is representative of an instantaneous frequency profile of the reflected ultrasonic signal paths 162, 166, and 168 during the ranging operation. Thus, the ranging processor 18 can assert the digital detection signal DET shortly after the time $T_0$ based on the counter, similar to as described previously in the example of FIG. 2.

At a time $T_1$, the ultrasonic transducer 152 receives the second reflected ultrasonic signal path 166 having been reflected from the second target object 158 back to the ultrasonic transducer 152 via a secondary reflection from the ground. As a result, the associated phase function $\varphi(t)$ temporarily increases as an abrupt phase change relative to the slope of the phase function $\varphi(t)$, similar to as described in the example of FIG. 2. Based on the convolution operation between the phase function $\varphi(t)$ and the predetermined ramp function rmp(t), the frequency profile f exhibits a temporary increase in the profile based on the abrupt phase change in the phase function $\varphi(t)$. In the example of FIG. 2, the frequency profile f is demonstrated as increasing greater than the first predetermined threshold TH1 just subsequent to the time $T_1$, and subsequently returns to less than the first predetermined threshold TH1. As an example, the ranging processor 18 can monitor a duration of time that the frequency profile f is between the first and second predetermined thresholds TH1 and TH2, such that, in response to the frequency profile f being between the first and second predetermined thresholds TH1 and TH2 for a programmable threshold duration of time, the ranging processor 18 can determine that the ultrasonic transducer 14 received the second reflected ultrasonic signal path 166 from the second target object 158, similar to as described previously in the example of FIG. 2.

At a time $T_2$, the ultrasonic transducer 152 receives the third reflected ultrasonic signal path 168 having been reflected from the third target object 160 directly back to the ultrasonic transducer 152. As a result, the associated phase function $\varphi(t)$ temporarily increases as an abrupt phase change relative to the slope of the phase function $\varphi(t)$, similar to as described in the example of FIG. 2. Based on the convolution operation between the phase function $\varphi(t)$ and the predetermined ramp function rmp(t), the frequency profile f exhibits a temporary increase in the profile based on the abrupt phase change in the phase function $\varphi(t)$. Thus, the frequency profile f again increases greater than the first predetermined threshold TH1 just subsequent to the time $T_2$, and subsequently returns to less than the first predetermined threshold TH1. As an example, the ranging processor 18 can monitor a duration of time that the frequency profile f is between the first and second predetermined thresholds TH1 and TH2, such that, in response to the frequency profile f being between the first and second predetermined thresholds TH1 and TH2 for a programmable threshold duration of time, the ranging processor 18 can determine that the ultrasonic transducer 14 received the third reflected ultrasonic signal path 168 from the third target object 160, similar to as described previously in the example of FIG. 2.

At a time $T_3$, the phase function $\varphi(t)$ can enter the ringdown region. As a result, the associated phase function $\varphi(t)$ changes the slope based on a change in frequency of the received ultrasonic energy (e.g., as reflected from the target objects 156, 158, and 160), with the frequency of the ringdown energy being based on manufacturing tolerances associated with the ultrasonic transducer 152, and therefore being unpredictable. As a result, the frequency profile f is demonstrated as decreasing less than the second predetermined threshold TH2 just subsequent to the time $T_3$, and remains less than the second predetermined threshold TH2 thereafter based on the change in frequency associated with the phase function $\varphi(t)$. As an example, the ranging processor 18 can conclude the ranging operation, and thus the detection of the target objects 156, 158, and 160 until initiating the next ranging operation.

Figure 6:
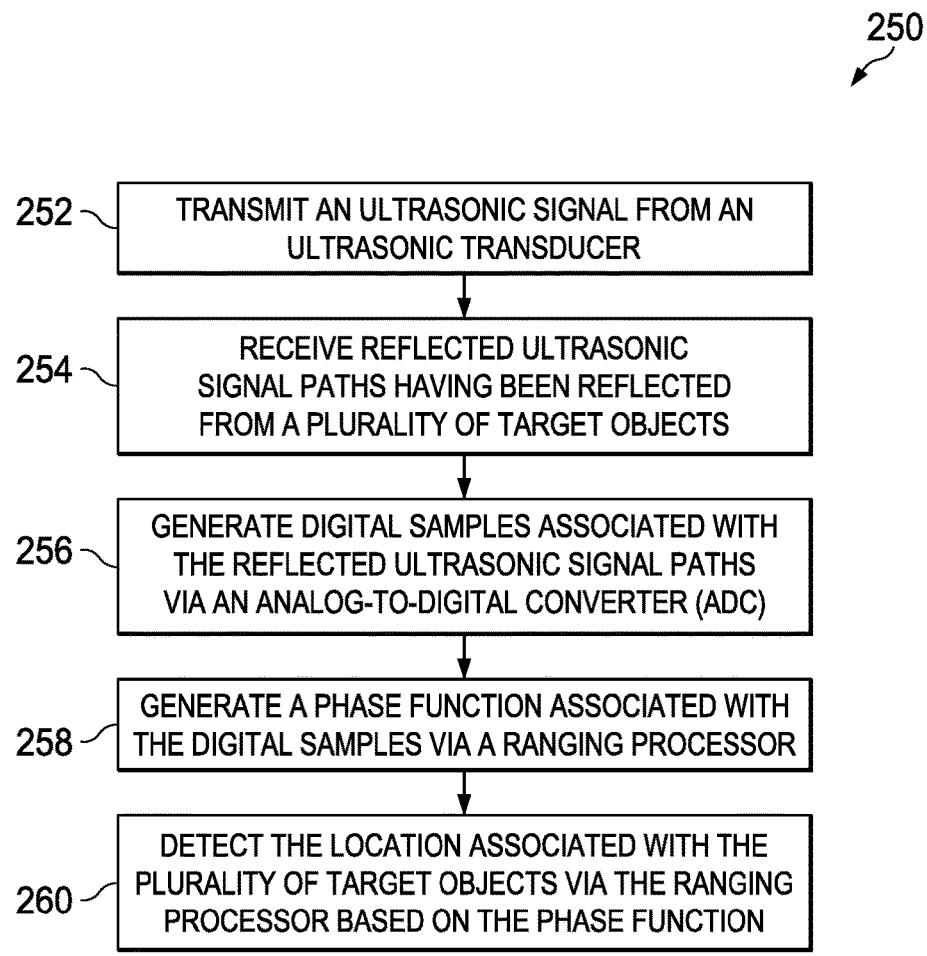
FIG. 6 illustrates an example of a method for determining a location of a plurality of target objects in an ultrasonic ranging system.

In view of the foregoing structural and functional features described above, a method in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 6 illustrates an example of a method 250 for determining a location of a plurality of target objects (e.g., the target objects 12) in an ultrasonic ranging system (e.g., the ultrasonic ranging system 10). At 252, an ultrasonic signal (e.g., the ultrasonic signal $USNC_T$) is transmitted from an ultrasonic transducer (e.g., the ultrasonic transducer 14). At 254, reflected ultrasonic signal paths (e.g., the reflected ultrasonic signal paths $USNC_R$) having been reflected from the plurality of target objects are received. At 256, digital samples (e.g., the digital samples SMPL) associated with the reflected ultrasonic signal paths are generated via an ADC (e.g., the ADC 16). At 258, a phase function (e.g., the phase function $\varphi(t)$) associated with the digital samples is generated via a ranging processor (e.g., the ranging processor 18). At 260, the location associated with the plurality of target objects is detected via the ranging processor based on the phase function.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. An ultrasonic ranging system, comprising:
an ultrasonic transducer configured to transmit an ultrasonic signal and to receive reflected ultrasonic signal paths having been reflected from a plurality of target objects during a ranging operation; and
a ranging processor coupled to receive signals from the ultrasonic transducer and configured to generate a frequency profile to detect a location associated with the plurality of target objects based on monitoring phase information developed by forming complex analytic signals from digital samples of the signals associated with the reflected ultrasonic signal paths, wherein each complex analytic signal includes a real value and an imaginary value.

2. The system of claim 1, wherein the ranging processor is configured to monitor the reflected ultrasonic signal paths to detect a location associated with the plurality of target objects based on detecting a phase change in received ultrasonic signals associated with the reflected ultrasonic signal paths.

3. The system of claim 1, wherein the ranging processor is configured to implement a convolution operation between the phase information associated with the reflected ultrasonic signal paths and a predetermined ramp function to generate the frequency profile to detect the location associated with the plurality of target objects.

4. The system of claim 3, wherein the ranging processor is configured to compare the frequency profile to at least one predetermined threshold to detect the location of the plurality of target objects.

5. The system of claim 4, wherein the ranging processor is configured to monitor a counter value with respect to the frequency profile relative to the at least one predetermined threshold to detect the plurality of target objects associated with the ultrasonic transducer.

6. The system of claim 5, wherein the ranging processor is configured to monitor a second counter value with respect to the frequency profile falling outside a range defined by the at least one predetermined threshold for a predetermined count value threshold to detect that the ultrasonic transducer has entered a ringdown region to conclude the ranging operation.

7. The system of claim 3, wherein the ranging processor is configured to implement the convolution operation between a phase function corresponding to the phase information and the predetermined ramp function to generate the frequency profile, wherein the ranging processor is configured to detect a location of the plurality of target objects based on the frequency profile being less than a first predetermined threshold and greater than a second predetermined threshold for greater than a predetermined count value threshold.

8. The system of claim 7, wherein the ranging processor is configured to detect a location of at least one additional target object after a first target object of the plurality of target objects based on the frequency profile falling outside a range defined by at least one of the first predetermined threshold and the second predetermined threshold and subsequently returning to being less than the first predetermined threshold and greater than the second predetermined threshold for greater than the predetermined count value threshold.

9. The system of claim 1, further comprising an analog-to-digital converter (ADC) configured to generate the digital samples associated with the reflected ultrasonic signal paths and a band-pass filter configured to filter the digital samples, wherein the ranging processor is configured to generate a phase function using the complex analytic signals associated with the filtered digital samples and to detect the location associated with the plurality of target objects based on the phase function.

10. The system of claim 1, wherein the ultrasonic transducer is a first ultrasonic transducer, the system further comprising at least one additional ultrasonic transducer configured to transmit at least one additional ultrasonic signal and to receive respective additional reflected ultrasonic signal paths having been reflected from the plurality of target objects, wherein the ranging processor is configured to detect the location associated with the plurality of target objects based on interpolating the phase information associated with each of the reflected ultrasonic signal paths and the respective additional reflected ultrasonic signal paths.

11. An automobile motion parking assist system comprising the ultrasonic ranging system of claim 1.

12. A method for determining a location of a plurality of target objects in an ultrasonic ranging system, the method comprising:
transmitting an ultrasonic signal from an ultrasonic transducer;
receiving reflected ultrasonic signal paths having been reflected from the plurality of target objects;
generating digital samples associated with the reflected ultrasonic signal paths via an analog-to-digital converter (ADC);
generating a phase function associated with the digital samples via a ranging processor by forming complex analytic signals from the digital samples, wherein each complex analytic signal includes a real value and an imaginary value;
generating a frequency profile based on the phase function; and
detecting the location associated with the plurality of target objects via the ranging processor based on the frequency profile.

13. The method of claim 12, wherein detecting the location comprises detecting a phase change associated with the reflected ultrasonic signal paths based on the phase function.

14. The method of claim 12, further comprising implementing a convolution operation between the phase function and a predetermined ramp function to generate the frequency profile, wherein detecting the location comprises comparing the frequency profile to at least one predetermined threshold to detect the plurality of target objects.

15. The method of claim 14, wherein comparing the frequency profile comprises detecting a location of the plurality of target objects based on the frequency profile being less than a first predetermined threshold and greater than a second predetermined threshold.

16. The method of claim 12, wherein transmitting the ultrasonic signal comprises transmitting a plurality of ultrasonic signals from a respective plurality of ultrasonic transducers, wherein receiving the reflected ultrasonic signal paths comprises receiving a plurality of sets of reflected ultrasonic signal paths at each of the respective plurality of ultrasonic transducers, wherein generating the phase function comprises generating a respective plurality of phase functions, and wherein detecting the location comprises interpolating the location associated with the plurality of target objects based on the plurality of phase functions via the ranging processor.

17. An ultrasonic ranging system comprising:
an ultrasonic transducer configured to:
  transmit an ultrasonic signal;
  receive a response to the ultrasonic signal produced by a plurality of target objects;
  provide an analog signal based on the response to the ultrasonic signal;
an analog-to-digital converter (ADC) configured to digitize the analog signal to generate a set of digital samples associated with the response; and
a ranging processor configured to:
  receive the set of digital samples; and
  detect a location associated with each of the plurality of target objects based on a frequency profile associated with phase information of the set of digital samples determined by forming complex analytic signals from the set of digital samples and determining the phase information from the complex analytic signals, and based on a phase change associated with the phase information, wherein each complex analytic signal includes a real value and an imaginary value.

18. The system of claim 17, wherein the ranging processor is configured to detect the location by:
  implementing a convolution operation between the phase information and a ramp function to generate the frequency profile; and
  detecting the phase change associated with the phase information based on the frequency profile.

19. The system of claim 18, wherein the ranging processor is configured to detect the phase change by:
  comparing the frequency profile to a set of thresholds; and
  initiating a counter when the frequency profile crosses a first threshold of the set of thresholds.

20. The system of claim 19, wherein the ranging processor is configured to:
  detect the location of a first target of the plurality of target objects based on the counter indicating that the frequency profile remained in a range between the first threshold and a second threshold of the set of thresholds for at least a duration; and
  detect the location of a second target of the plurality of target objects based on the frequency profile exceeding the first threshold and the second threshold and the counter indicating that the frequency profile subsequently returned to the range between the first threshold and the second threshold for at least the duration.

* * * * *